US007739710B2

(12) United States Patent
Kwon et al.

(10) Patent No.: US 7,739,710 B2
(45) Date of Patent: Jun. 15, 2010

(54) METHOD FOR REGISTERING AND DISPLAYING DIGITAL MULTIMEDIA BROADCASTING CHANNELS IN A MOBILE TERMINAL WITH A FUNCTION FOR RECEIVING DIGITAL MULTIMEDIA BROADCASTING

(75) Inventors: Seong-Geun Kwon, Daegu (KR); Dong-Han Kang, Daegu (KR)

(73) Assignee: Samsung Electronics Co., Ltd (KR)

( * ) Notice: Subject to any disclaimer, the term of this patent is extended or adjusted under 35 U.S.C. 154(b) by 784 days.

(21) Appl. No.: 11/248,055

(22) Filed: Oct. 11, 2005

(65) Prior Publication Data
US 2006/0080709 A1 Apr. 13, 2006

(30) Foreign Application Priority Data
Oct. 11, 2004 (KR) ............... 10-2004-0080910

(51) Int. Cl.
G06F 3/00 (2006.01)
G06F 13/00 (2006.01)
H04N 5/445 (2006.01)
H04M 3/42 (2006.01)

(52) U.S. Cl. .................... 725/45; 725/47; 725/52; 455/414.1

(58) Field of Classification Search ............ 725/39, 725/44, 45, 47
See application file for complete search history.

(56) References Cited
U.S. PATENT DOCUMENTS 5,589,892 A * 12/1996 Knee et al. .............. 725/43
5,850,218 A * 12/1998 LaJoie et al. ............ 725/45
6,147,714 A    11/2000 Terasawa et al.
6,459,906 B1 * 10/2002 Yang ................... 455/556.1
6,493,688 B1 * 12/2002 Das et al. ............... 706/20
6,628,735 B1    9/2003 Belotserkovsky et al.
2001/0016945 A1 * 8/2001 Inoue .................. 725/44
2003/0163814 A1    8/2003 Hayakawa
2004/0109508 A1    6/2004 Jeon et al.
2004/0158876 A1    8/2004 Lee
2005/0204385 A1 * 9/2005 Sull et al. ............... 725/45

FOREIGN PATENT DOCUMENTS

| CN | 1441599 | 9/2003 |
|---|---|---|
| EP | 0 921 689 | 6/1999 |
| JP | 2003-209754 | 7/2003 |
| JP | 2003209754 A * | 7/2003 |
| KR | 1999-0020636 | 6/1999 |
| KR | 1020050119348 | 12/2005 |
| WO | WO 01/72039 | 9/2001 |

* cited by examiner

Primary Examiner—Dominic D Saltarelli
(74) Attorney, Agent, or Firm—The Farrell Law Firm, LLP

(57) ABSTRACT

A method is provided for registering and displaying digital multimedia broadcasting (DMB) channels in a mobile terminal capable of receiving DMB. A selection of DMB mode is detected and electronic program guide (EPG) information is received. The received EPG information is analyzed and the analyzed received EPG information is divided into fixed program channel information and dynamic program channel information. The fixed program channel information is matched with a genre in which a fixed program channel has been registered, and a result of the matching is displayed. The dynamic program channel information is matched with a genre in which a dynamic program channel has been registered and a genre of a program currently being broadcast on the dynamic program channel, and a result of the matching is displayed.

5 Claims, 5 Drawing Sheets

METHOD FOR REGISTERING AND DISPLAYING DIGITAL MULTIMEDIA BROADCASTING CHANNELS IN A MOBILE TERMINAL WITH A FUNCTION FOR RECEIVING DIGITAL MULTIMEDIA BROADCASTING

PRIORITY

This application claims priority to an application entitled "METHOD FOR REGISTERING AND DISPLAYING DIGITAL MULTIMEDIA BROADCASTING CHANNELS IN A MOBILE TERMINAL WITH A FUNCTION FOR RECEIVING DIGITAL MULTIMEDIA BROADCASTING", filed in the Korean Intellectual Property Office on Oct. 11, 2004 and assigned Ser. No. 2004-80910, the contents of which are incorporated herein by reference.

BACKGROUND OF THE INVENTION

1. Field of the Invention

The present invention relates generally to a terminal for receiving digital multimedia broadcasting (DMB), and more particularly to a method for displaying a channel guide in a mobile terminal with a function for receiving DMB.

2. Description of the Related Art

Digital multimedia broadcasting (DMB) is a broadcasting service for providing various multimedia broadcasting content such as video, audio and data. Subscribers can view or listen to the broadcasting content through a personal portable receiver or a vehicle receiver equipped with an antenna. When watching the DMB through a mobile terminal, users can view various broadcasting channel guides displayed on a screen to select a desired broadcasting channel. Hereinafter, the term "channel information" indicates, for example, "Channel 11" or "MBC", and the term "program" is a generic term including a specific program such as "9 O'clock News" or a commercial film (CF), etc. The term "channel guide" indicates a list of channel information and programs that a user can select on channels.

Mobile terminals with DMB reception receive code division multiplexing (CDM) channel information associated with the DMB service from a satellite. The received channel information includes electronic program guide (EPG) information. Because table information of the EPG is re-transmitted periodically, the user can receive the EPG information through the DMB service at any time. FIG. 1 illustrates the format of a conventional EPG.

Referring to FIG. 1, EPG information tables include a broadcaster information table (BIT) 101, a service description table (SDT) 103, an event information table (EIT) 105, and a time offset table (TOT) 107. The BIT 101 is used to transfer broadcaster information. That is, the BIT 101 is used to transfer a notification, a broadcaster name, and a current channel list. The BIT 101 uses a broadcast identification (ID) to identify different BITs.

The SDT 103 is used to transfer information of each channel. The channel information includes a channel name, channel uniform resource locator (URL) information, information indicating if a channel a pay-channel, the channel type, that is, a video or audio channel, and information indicating if a channel is recordable. The SDT 103 uses a service ID to identify different SDTs.

The EIT 105 indicates genre information of each program. Through the EIT 105, a program name, program URL information, a program start time, information of a period of time required for broadcasting a program, parental rating information and program genre information are transferred. The EIT 105 uses an event ID to identify different events from each other.

The TOT 107 includes current time information and is used to determine which program is being broadcast, or to display the current time. The user can identify various DMB channel information using the EPG information in real time. Because DMB channel information is displayed in a DMB channel guide in order of channel numbers, the user is inconvenienced to determine which channel a particular program is on.

The DMB includes programs of various genres that are broadcast according to a schedule. To watch a desired genre program, like drama, on channels that provide programs of various genres, the user must retrieve programs currently being broadcast on the channel one by one to find the drama shows.

SUMMARY OF THE INVENTION

Accordingly, the present invention has been designed to solve the above and other problems occurring in the prior art. Therefore, it is an aspect of the present invention to provide a method that can display a channel guide in the form of a phone book and dynamically display information of a channel for providing programs of various genres in the channel guide, in a mobile terminal with a function for receiving digital multimedia broadcasting.

The above and other aspects of the present invention can be achieved by a method for displaying digital multimedia broadcasting (DMB) channels in a mobile terminal capable of receiving DMB. The method includes detecting a selection of DMB mode and receiving electronic program guide (EPG) information; analyzing the received EPG information and dividing the analyzed received EPG information into fixed program channel information and dynamic program channel information; matching the fixed program channel information with a genre in which a fixed program channel has been registered, and displaying a result of the matching; and matching the dynamic program channel information with a genre in which a dynamic program channel has been registered and a genre of a program currently being broadcast on the dynamic program channel, and displaying a result of the matching.

BRIEF DESCRIPTION OF THE DRAWINGS

The above and other aspects and advantages of the present invention will be more clearly understood from the following detailed description taken in conjunction with the accompanying drawings, in which.

DETAILED DESCRIPTION OF THE PREFERRED EMBODIMENTS

Figure 1:
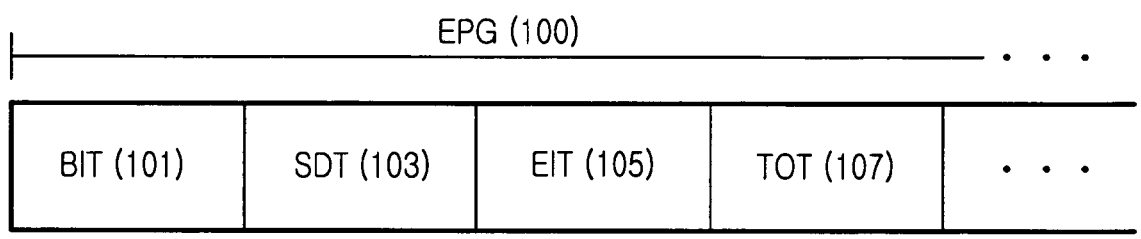
FIG. 1 illustrates the format of a conventional electronic program guide (EPG)

In the following description, a detailed description of known functions and configurations incorporated herein will be omitted for conciseness. Preferred embodiments of the present invention will be described in detail herein below with reference to the accompanying drawings. In the drawings, the same or similar elements are denoted by the same reference numerals even though they are depicted in different drawings. Additionally, in the following description, specific details such as channel numbers, private or public broadcasting, and program names are shown. Such description of the specific details has been made only for a better understanding of the present invention. Those skilled in the art will appreciate that the present invention can be implemented without using the above-mentioned specific details.

Figure 2:
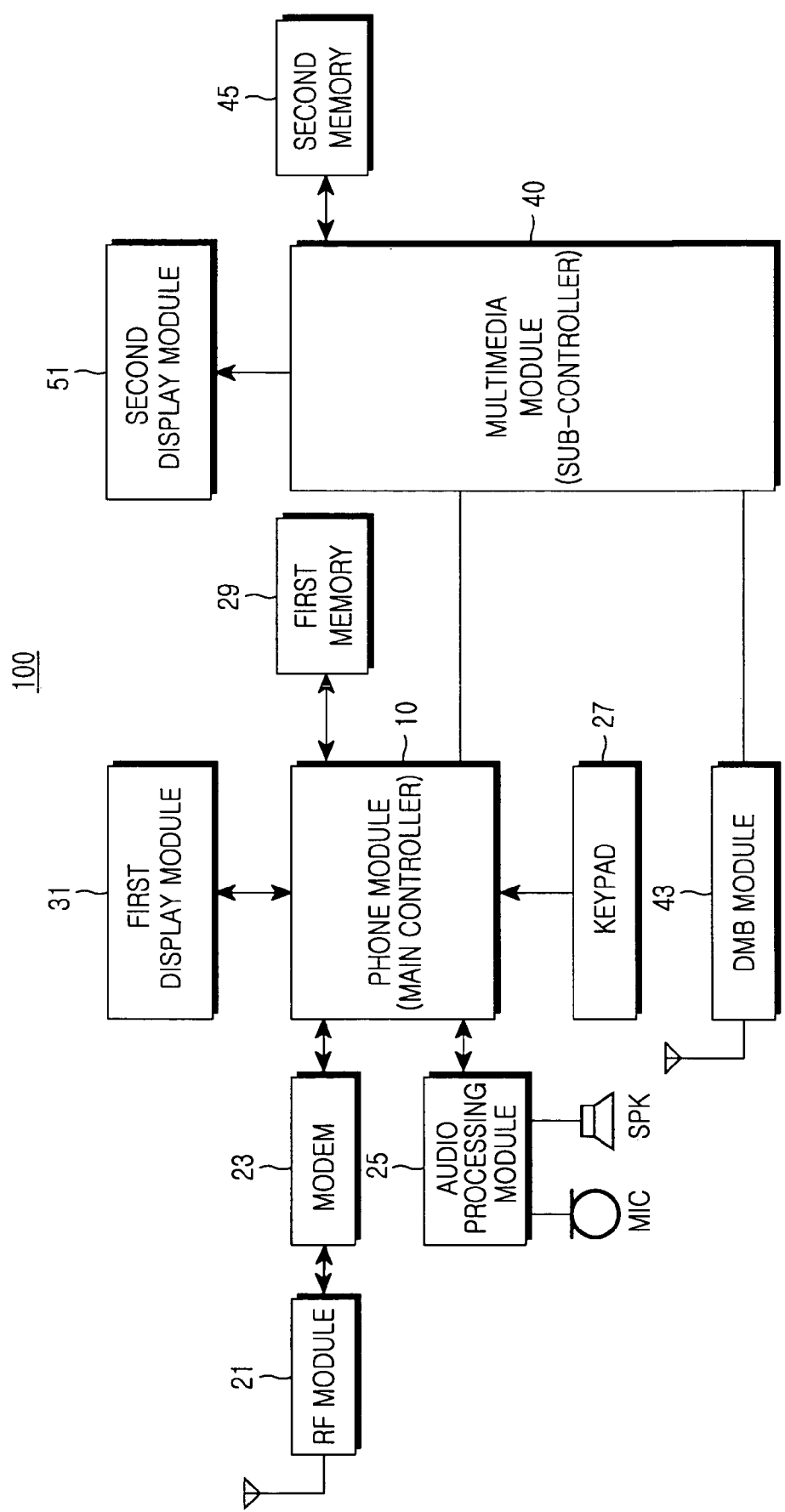
FIG. 2 is a block diagram illustrating a mobile terminal capable of receiving digital multimedia broadcasting (DMB) in accordance with an embodiment of the present invention.

FIG. 2 is a block diagram illustrating a mobile terminal capable of receiving digital multimedia broadcasting (DMB) in accordance with an embodiment of the present invention. This embodiment assumes that a first module serving as a phone module 10, a second module serving as a DMB module 43, and a third module serving as a multimedia module 40 are physically separated from one another. Alternatively, the three modules may be totally or partially integrated into a single chip that is called a controller for convenience.

Referring to FIG. 2, the phone module 10 can be implemented by a radio frequency (RF) transceiver and a modulator-demodulator (MODEM) chip (not shown), for example, QUALCOMM's mobile station modem (MSM) 5500. The phone module 10 transmits and receives a call-related signal and controls overall function of the mobile terminal including a portable phone function.

An RF module 21 performs the communication function of the mobile phone. The RF module 21 includes an RF transmitter for up converting and amplifying a frequency of a signal to be transmitted and an RF receiver for low-noise amplifying a received signal and down converting a frequency of the received signal.

A MODEM 23 includes a transmitter for encoding and modulating the signal to be transmitted, a receiver for demodulating and decoding the received signal, etc. An audio processing module 25 can configure a coder-decoder (CODEC). The CODEC (not shown) includes a data CODEC for processing packet data, etc. and an audio CODEC for processing an audio signal such as voice, etc.

The audio processing module 25 converts a digital audio signal received by the MODEM 23 into an analog audio signal through the audio CODEC to reproduce the analog signal or converting an analog audio signal generated from a microphone (MIC) into a digital audio signal through the audio CODEC to transmit the digital audio signal to the MODEM 23. The CODEC may be configured separately or may be included in the phone module 10.

A keypad 27 includes keys to input number and letter information and function keys to set various functions. More specifically, the keypad 27 can include a DMB mode execution or release key, a broadcasting channel selection key, etc., in accordance with an embodiment of the present invention.

First and second display modules 31 and 51 can use a liquid crystal display (LCD). In this case, the display modules 31 and 51 can include an LCD controller, a memory capable of storing image data, an LCD element, etc. When the LCD is implemented using a touch-screen system, the keypad 27 and the LCD can serve as an input unit. The display module displays image data. The first display module 31 displays information associated with overall function of the mobile terminal including the portable phone function and a DMB channel guide, etc.

The second display module 51 displays an image signal output from the multimedia module 40. The DMB module 43 includes a receiver for receiving a DMB RF signal through an antenna and a demodulator for demodulating the received DMB RF signal (not shown).

The multimedia module 40 decodes DMB data received from the DMB module 43 and outputs multimedia information (video, text, audio, etc.) for a user. The multimedia module 40 transmits generated DMB channel information to the phone module 10. An H.264 CODEC multimedia processor can implement the multimedia module 40.

A first memory 29 stores information associated with the overall function of the mobile terminal including the portable phone function. The first memory 29 can store a program for registering a DMB channel in a category of a corresponding genre when the DMB channel is set up or selected. The channel information can be stored in a second memory 45. More specifically, the second memory 45 stores a program for dynamically displaying channel information in a specific category corresponding to the currently broadcast program genre.

Operation of the portable phone will be described with reference to FIG. 2. When the user sets signal transmission mode after a dialing operation through the keypad 27, the phone module 10 senses the set signal transmission mode, controls the MODEM 23 to process received dial information, and controls the RF module 21 to convert the processed information into an RF signal and output the RF signal. Subsequently, when an opposite subscriber generates a response signal, the phone module 10 detects the response signal through the RF module 21 and the MODEM 23. The user performs a communication function by means of a voice communication path established through the audio processing module 25.

When receiving a signal, the phone module 10 senses the signal reception mode through the MODEM 23 and controls the audio processing module 25 to generate a ringtone. Subsequently, when the user responds, the phone module 10 detects the response. The user performs a communication function by means of a voice communication path established through the audio processing module 25. Although an example of voice communication in the signal transmission and reception modes has been described above, a data communication function for communicating packet data and image data other than the voice communication can be performed. When idle mode is entered, or character or text communication is performed, the phone module 10 controls the first display module 31 to display character or text data processed through the MODEM 23.

A mobile terminal 100 with the above-mentioned components performs the portable phone function or the multimedia function according to the user's manipulation through the keypad 27. The user can watch the DMB through the second display module 51, and can identify a unique function of the portable phone or a DMB channel guide through the first display module 31. The DMB channel guide can be dynamically varied according to time or a particular program.

Figure 3:
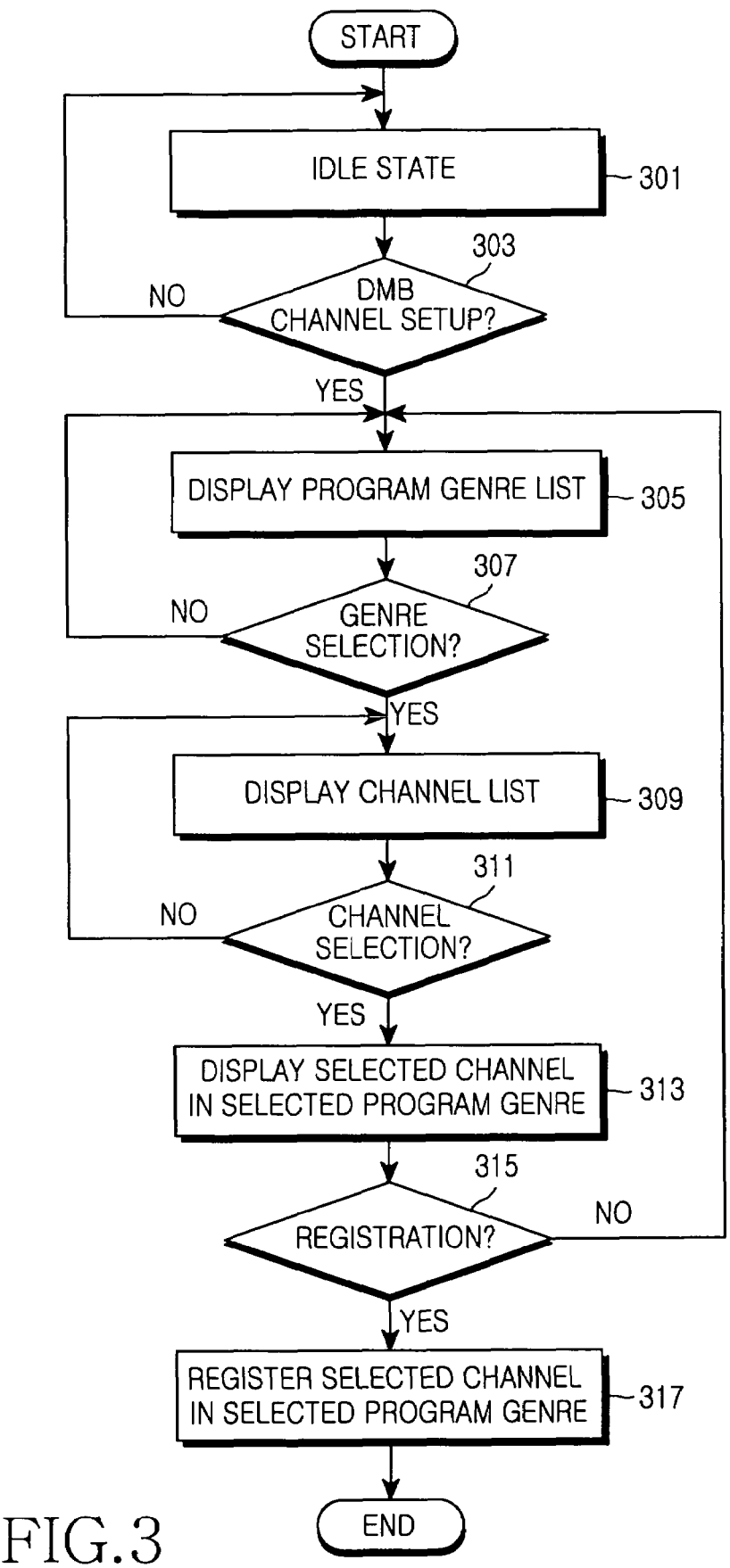
FIG. 3 is a flow chart illustrating an operation for registering a multimedia broadcasting channel in a corresponding genre in the mobile terminal of FIG. 2.

FIG. 3 is a flow chart illustrating an operation for registering a multimedia broadcasting channel in a corresponding genre in the mobile terminal in accordance with an embodiment of the present invention. Referring to FIG. 3, when the user selects DMB channel setup in the DMB mode using the keypad 27 in the idle state in step 301, the phone module 10 detects the selected DMB channel setup in step 303 and controls the first memory 29 and the first display module 31 to display a list of program genres as seen from Table 1, in step 305.

TABLE 1

| Item No. | Program Genre |
|---|---|
| 1 | Sports |
| 2 | Drama |
| 3 | Movie |
| 4 | Synthetic |

The phone module waits for the user to select a genre in step 307. When the user selects a corresponding genre from the list of program genres using the keypad 27, the phone module 10 detects the selected genre in step 307 and proceeds to step 309. The phone module 10 controls the first memory 29 and the first display module 31 to display a DMB channel list as seen in Table 2, in step 309.

TABLE 2

| DMB Channel List |
|---|
| Channel 1 (SBS sports) |
| Channel 2 (MBC sports) |
| Channel 3 (KBS drama) |
| Channel 4 (MBC drama) |
| Channel 5 (OCN) |
| Channel 6 (Dongah TV) |
| Channel 7 (Comedy TV) |

The phone module 10 waits for a user selection in step 311. When the user selects a channel associated with the selected genre from the DMB channel list using the keypad 27, the phone module 10 detects the selected channel in step 311 and then controls the first display module 31 to display the selected channel in the genre selected in step 307.

When the user selects registration of the selected channel using the keypad 27 in step 315, the phone module 10 detects the selection and then proceeds to step 317 where the phone module 10 controls the first memory 29 to register the selected channel in the selected program genre.

For example, to register sports channels, the user selects the "Sports" genre of Item 1 from the list of program genres and selects "Channel 1 (SBS sports)" and "Channel 2 (MBC sports)" belonging to the "Sports" genre, such that Channel 1 and Channel 2 are registered in a category of the "Sports" genre in the form of a phone book. To register channels for broadcasting programs of various genres, the user selects the "Synthetic" genre of Item 4 from the program genre list, and selects "Channel 6 (Dongah TV)" and "Channel 7 (Comedy TV)", such that Channel 6 and Channel 7 are registered in a category of the "Synthetic" genre in the form of the phone book.

Figure 4:
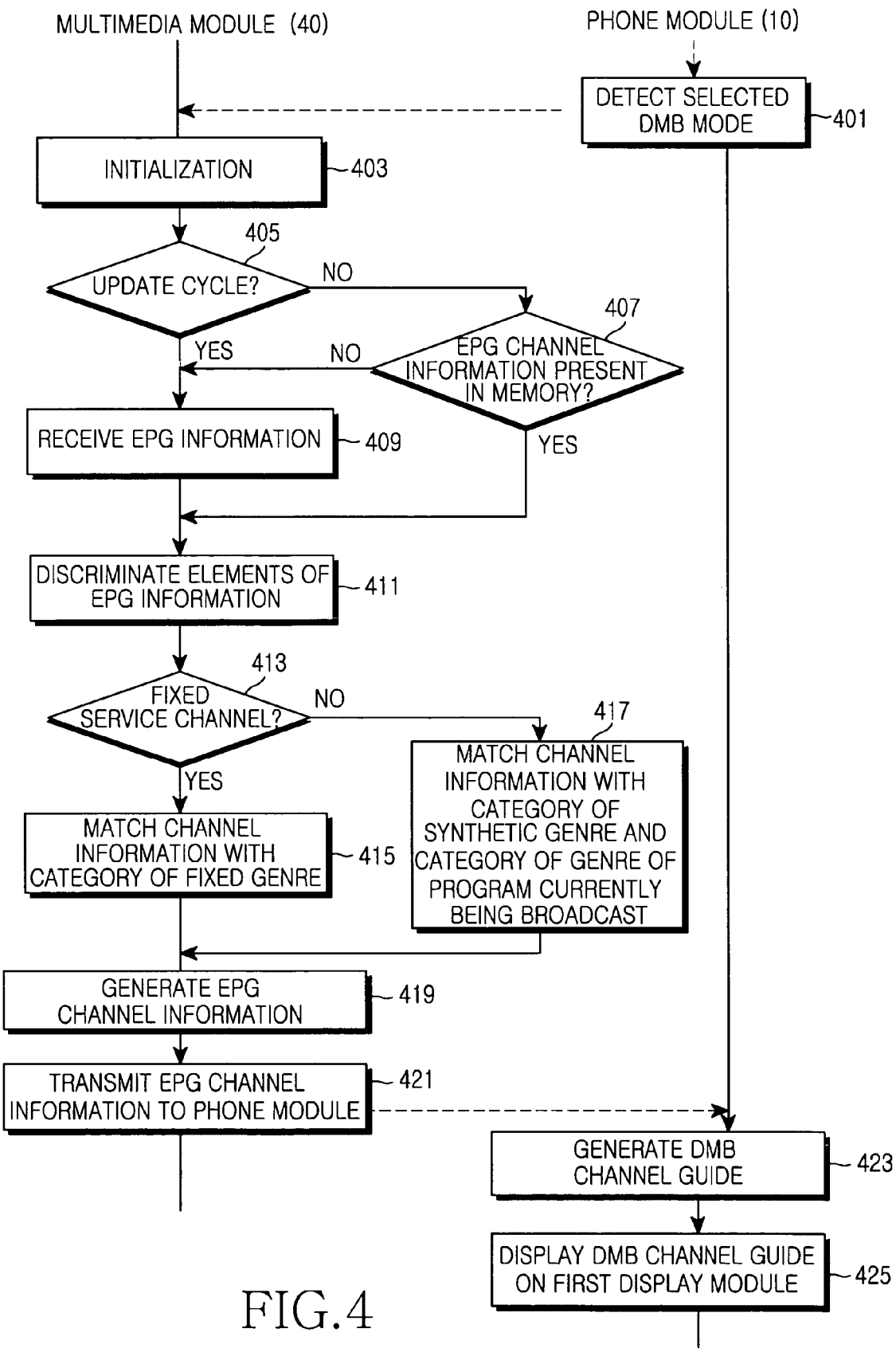
FIG. 4 is a ladder diagram illustrating an operation for displaying DMB channel information by means of the mobile terminal with the DMB reception function.

FIG. 4 is a ladder diagram illustrating an operation for displaying DMB channel information by means of the mobile terminal with the DMB reception function in FIG. 2. The operation for displaying DMB channel information by means of the mobile terminal will be described with reference to FIG. 4. When the user selects DMB mode using the keypad 27, the phone module 10 detects the selected DMB mode in step 401. The phone module 10 notifies the multimedia module 40 that the user has selected the DMB mode. After being notified that the user has selected the DMB mode, the multimedia module 40 performs an initialization operation in step 403. In step 405, the multimedia module 40 determines if an update cycle of EPG information is reached, because the content and format of the EPG information may be changed at a predetermined time that may be defined by a broadcaster because the broadcaster may periodically send updated EPG information. If the update cycle is reached, the multimedia module 40 receives the EPG information. However, if the update cycle is not reached, the multimedia module 40 determines if the EPG information is present in the second memory 45 at step 407. When the EPG information is not present in the second memory 45, it may be determined that the operating state is an initial state or that the user has intentionally deleted the EPG information. When updating the EPG information, the user can delete the EPG information at any time.

If the EPG information is not found to be present in the second memory 45 in step 407, the multimedia module 40 receives the EPG information in step 409. The process of step 405→step 407→step 409 is performed on the basis of a user request (through the DMB mode selection) when the EPG information is not present in the second memory 45 although an update cycle of the EPG information is not reached.

When the EPG information is found to be present in the second memory 45 in step 407, or after the EPG information is received in step 409, the multimedia module 40 distinguishes information of each channel and genre information included in the EIT 105 by analyzing elements of the EPG information in step 411. The genre information included in the EIT 105 is divided into Content Nibble Level 1 and Content Nibble Level 2. Content Nibble Level 1 indicates a main genre, and Content Nibble Level 2 indicates a sub-genre belonging to the main genre. For example, when a value of Content Nibble Level 1 is "×1", the main genre is movie/drama. In this case, the sub-genre is a war or western movie when a value of Content Nibble Level 2 is "0×2", and the sub-genre is science fiction (SF), fantasy or horror when a value of Content Nibble Level 2 is "0×3". When a value of Content Nibble Level 1 is "0×4", the main genre is sports. In this case, the sub-genre is a special event game such as the Olympics or World Cup when a value of Content Nibble Level 2 is "0×1", and the sub-genre is a soccer game when a value of Content Nibble Level 2 is "0×3".

The multimedia module 40 detects fixed service channel information from the received EPG information in step 413, and matches the fixed service channel information with a set genre category in step 415. For example, when EPG information is received and Channel 1 (SBS sports) and Channel 2 (MBC sports) are registered in a category of the "Sports" genre as illustrated in FIG. 3, information of Channel 1 and Channel 2 is matched with the registered Channel 1 (SBS sports) and Channel 2 (MBC sports). When EPG information is received and Channel 3 (KBS drama) and Channel 4 (MBC drama) are registered in a category of the drama genre, information of Channel 3 and Channel 4 is matched with the registered Channel 3 (KBS drama) and Channel 4 (MBC drama).

Figure 5:
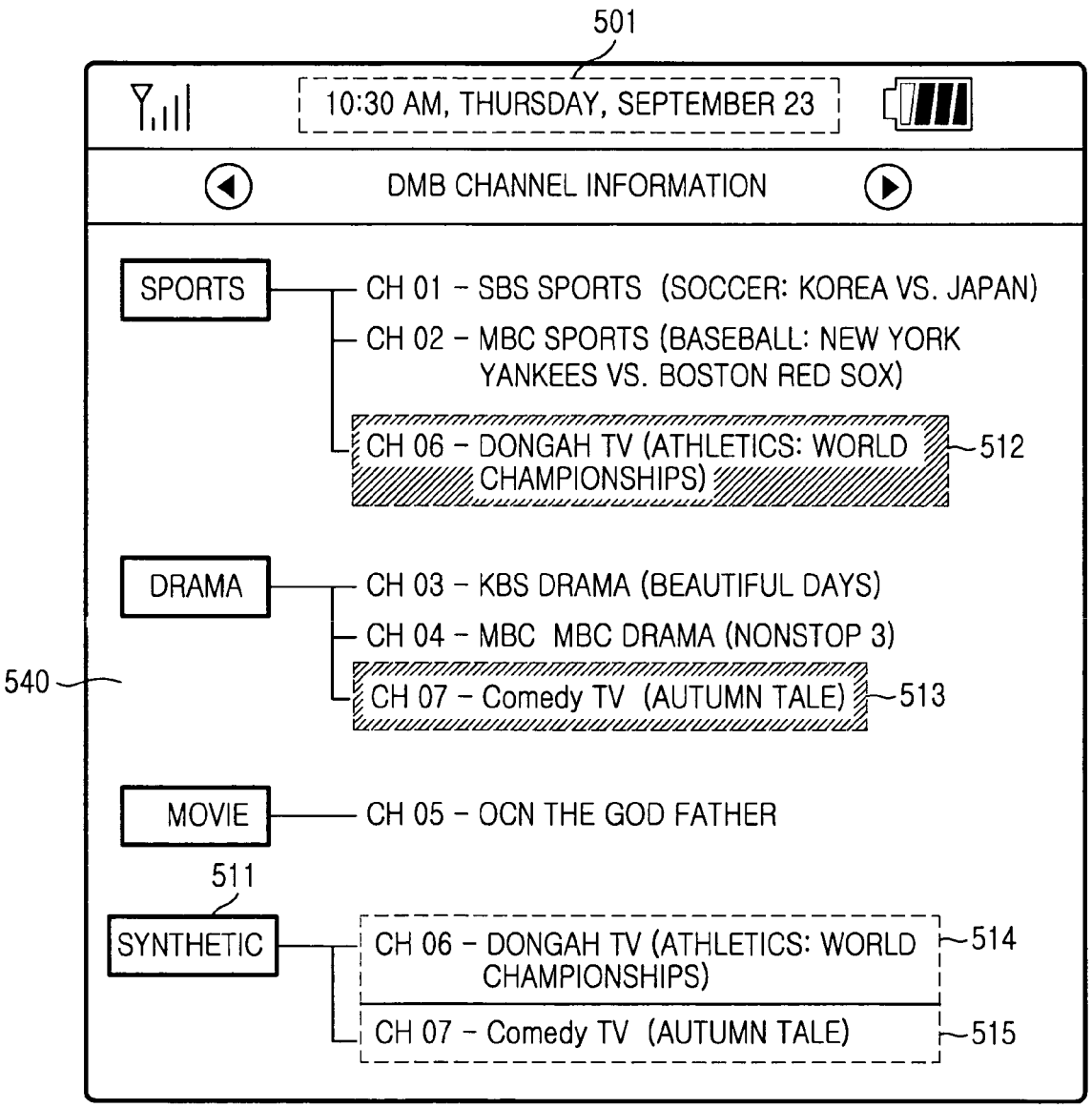
FIG. 5 illustrates an example of displaying a multimedia broadcasting channel guide in accordance with an embodiment of the present invention.

When the multimedia module 40 detects dynamic service channel information, that is, information of a dynamic service channel (for broadcasting programs of various genres), from the received EPG information in step 413, it matches the dynamic service channel information with a category of the "Synthetic" genre and a category of a genre based on genre information included in the EIT 105 in step 417. For example, when the EPG information is received and Channel 6 (Dongah TV) and Channel 7 (Comedy TV), which broadcast programs of various genres, are registered in the category of the "Synthetic" genre as illustrated in FIG. 3, information of Channel 6 and Channel 7 is matched with the registered Channel 6 (Dongah TV) and Channel 7 (Comedy TV), and is simultaneously matched with categories of genres of programs currently being broadcast in Channel 6 (Dongah TV) and Channel 7 (Comedy TV). Subsequently, the multimedia module 40 generates EPG channel information to store the generated EPG channel information in the second memory 45 in step 419, and then transmits the generated EPG channel information to the phone module 10 in step 421. Then, the phone module 10 generates a DMB channel guide based on the received EPG channel information and then controls the first display module 31 to display the generated DMB channel guide, as illustrated in FIG. 5, in step 423. When the update cycle is reached or the user desires to update the EPG information, steps 405 to 425 are performed repeatedly.

FIG. 5 illustrates an example of displaying a multimedia broadcasting channel guide in accordance with an embodiment of the present invention. Referring to FIG. 5, reference numeral 501 denotes the current date and time, and reference numeral 540 denotes a DMB channel guide in the form of a phone book. The DMB channel guide is divided into category information and channel information. In the category information, a variety of genres such as "Sports", "Drama", "Movie", and "Synthetic" are set, and a channel associated with each category is set. The channel information includes a broadcaster name, a name of a program currently being broadcast, etc. In the "Synthetic" genre 511, a channel for broadcasting programs of various genres is registered. Because the genres currently being broadcast in channels for broadcasting programs of various genres are changed according to a schedule, the channels are displayed in the category of the "Synthetic" genre 511 as indicated by reference numerals 514 and 515. The "Sports" and "Drama" genres include programs denoted by reference numerals 512 and 513, displayed in their corresponding categories. When the "Sports" and "Drama" programs 512 and 513 are displayed in different categories, the channels of the "Sports" and "Drama" genres 512 and 513 can be displayed in different colors or sizes such that they may be distinguished from other channels.

As apparent from the above description, the present invention allows users to conveniently identify channel information by registering multimedia channel information in a corresponding category, displaying the registered information in the form of a phone book, and displaying a channel for providing programs of various genres in a corresponding category according to a genre of a program currently being broadcast.

Through the above-described process, a mobile terminal capable of receiving digital multimedia broadcasting can display channel information. Although preferred embodiments of the present invention have been disclosed for illustrative purposes, those skilled in the art will appreciate that various modifications, additions and substitutions are possible, without departing from the scope of the present invention. Therefore, the present invention is not limited to the above-described embodiments, but is defined by the following claims, along with their full scope of equivalents.

What is claimed is:

1. A method for displaying digital multimedia broadcasting (DMB) channels in a mobile terminal capable of receiving DMB, comprising:
    detecting a selection of DMB mode and receiving electronic program guide (EPG) information;
    analyzing the received EPG information and dividing the analyzed received EPG information into fixed program channel information and dynamic program channel information;
    matching the fixed program channel information with a genre in which a fixed program channel has been registered, and displaying a result of the fixed program channel information matching,
    wherein in displaying the result of the fixed program channel information matching, each fixed program channel is sorted according to the registered genre of each fixed program channel; and
    matching the dynamic program channel information with a genre in which a dynamic program channel has been registered and a genre of a program currently being broadcast on the dynamic program channel, and displaying a result of the dynamic program channel information matching,
    wherein in displaying the result of the dynamic program channel information matching, each dynamic program channel is sorted according to the genre currently being broadcast in each dynamic program channel and sorted according to the registered genre of each dynamic program channel.

2. The method according to claim 1, wherein the fixed program channel information and the dynamic program channel information are sorted by discriminating an event information table (EIT) from the EPG information.

3. The method according to claim 1, wherein the fixed program channel is a channel for broadcasting programs of one genre.

4. The method according to claim 1, wherein the dynamic program channel is a channel for broadcasting programs of at least one genre.

5. The method according to claim 1, wherein the dynamic program channel information displayed in a category corresponding to a genre of a program currently being broadcast is distinguished from the fixed program channel information.

* * * * *